Figure 1:
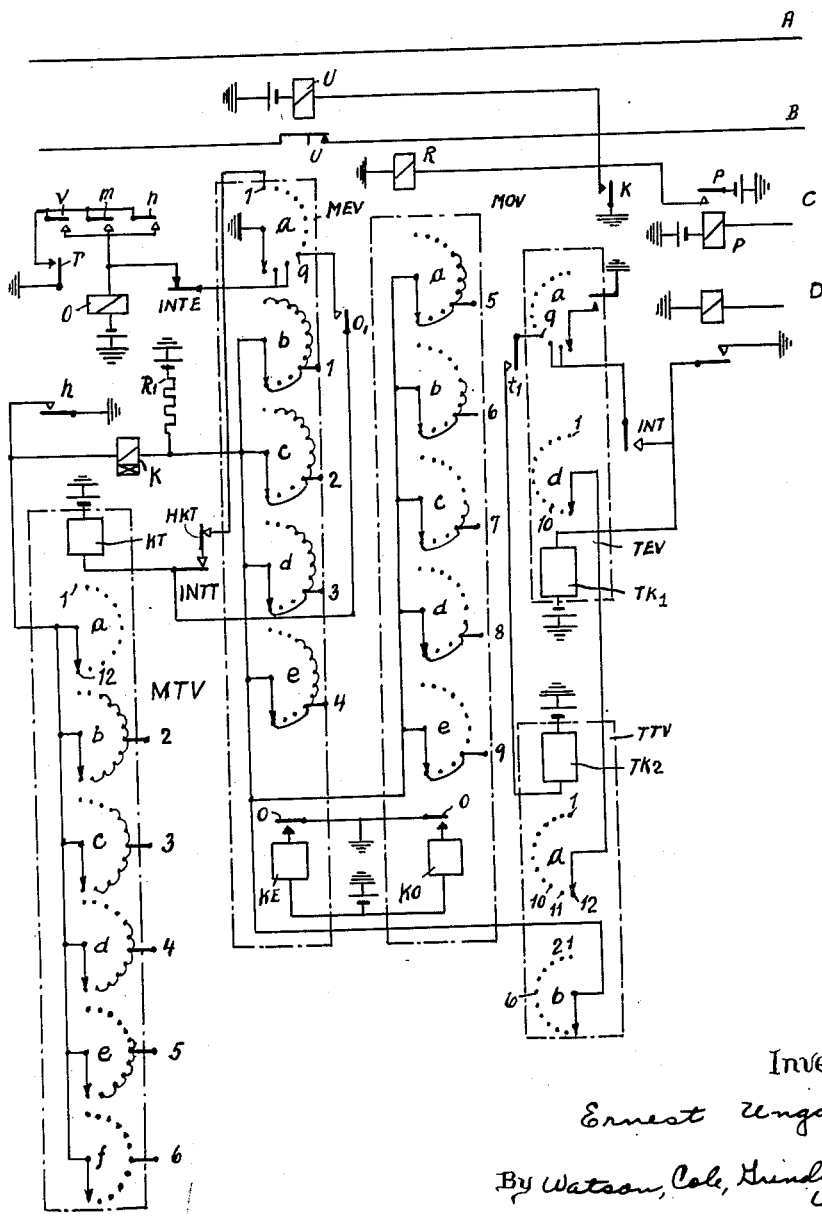

Dec. 30, 1952  E. UNGAR  2,623,950
DEPOSIT CONTROLLED TIMING SYSTEM FOR TELEPHONY
Filed Sept. 8, 1948  2 SHEETS—SHEET 1

Inventor
Ernest Ungar
By Watson, Cole, Grindle & Watson
Attorneys

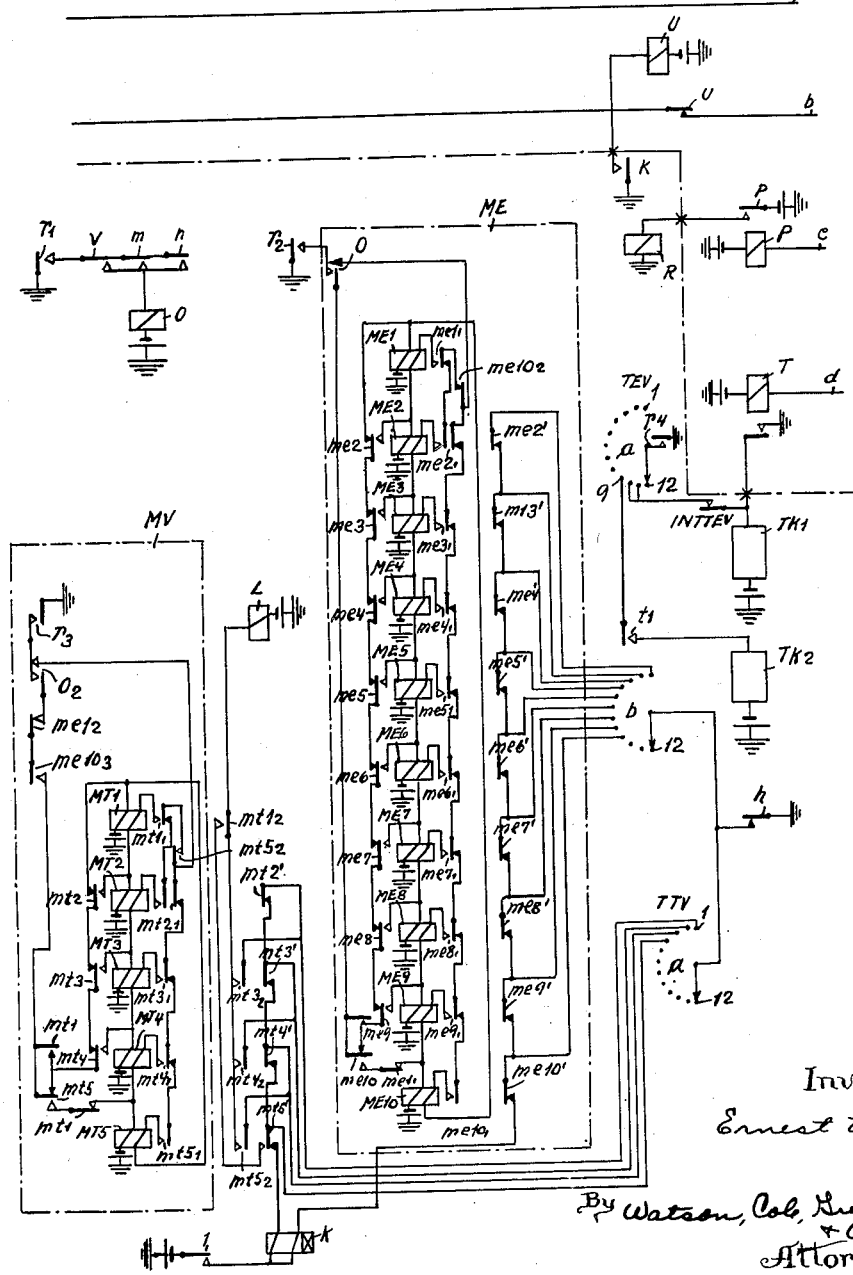

Patented Dec. 30, 1952

2,623,950

UNITED STATES PATENT OFFICE 2,623,950

DEPOSIT-CONTROLLED TIMING SYSTEM FOR TELEPHONY

Ernest Ungar, Lyngby, Denmark, assignor of one-half to Telefon Fabrik Automatic A/S, Copenhagen, Denmark, a joint-stock company of Denmark Application September 8, 1948, Serial No. 48,188
In Denmark September 15, 1947

3 Claims. (Cl. 179—9)

The present invention relates to an arrangement in coin control circuits comprising pulse controlled means for registering the amount paid into a coin operated apparatus in payment of calls in a telephone system, and for comparing the said amount with the charge for the call, and further comprising contact devices for indicating the charge, and a relay controlling contacts by way of which a desired connection is established.

Coin control circuits of the character referred to are necessary in the automatic handling of interurban calls where the charge for a certain period varies with the distance to the called subscriber. According to the rate systems generally used, the charge for a call is as a rule fixed at a certain amount for a certain period, e. g. a period of three minutes, the said amount varying with the distance between the subscribers in conversation. This rate system will in the following be referred to as rate system A. In automatic telephone systems working on this principle, the subscriber's meter in the exchange receives for each period of conversation a number of pulses corresponding to the charge. There exists also another rate system, according to which a certain basic charge entitles the subscriber to conduct a conversation for a period varying with the distance between the parties in conversation. This rate system will be referred to hereinafter as rate system B. In systems in which this rate system is used, the subscriber's meter in the exchange receives for each period of conversation one or more pulses corresponding to the basic charge.

In both of the said rate systems, it is desirable that a conversation may be conducted if an amount higher than that corresponding to the charge for a period of conversation has been paid into the coin operated apparatus of the subscriber. In this manner it is rendered possible to conduct a conversation even though the subscriber may not have the exact amount at his disposal. The excess amount paid may then be included in the charge for the next call or period of conversation. It is also desirable to arrange that the amount for a plurality of periods of conversation can be prepaid.

The object of this invention is to devise a coin control system, which is so arranged that it can be used in connection with both of the said rate systems and that a desired connection is established not only if the amount paid is equal to the charge, but also if it exceeds the latter, while, on the other hand, the connection as usually is not established, or if established is not maintained, but automatically interrupted if the amount paid into the coin control apparatus does not cover the charge for the call in question. A checking of the relation of the amount paid to the amount of the charge is repeated at the beginning of each period of conversation.

In coin control circuits of the character referred to, according to the invention, the said relay and the said contact devices, which may e. g. be rotary switches or relays, are coupled to each other in such a manner that if the coin registering devices assume contact positions showing that the amount paid for a desired call is equal to or exceeds the amount corresponding to the contact positions of the charge indication devices, a circuit connection by way of the relay and the said contact devices in series ensures that the connection is established, or if established is maintained, while if the contact positions of the coin registering devices indicate a paid amount less than the charge indicated by the positions of the charge indicating devices, the said circuit connection causes the said device to prevent the connection from being established or maintained.

In coin control circuits according to the invention, the contact devices for registering the amount paid and the contact devices for indicating the charge will ordinarily be divided into two groups, one of which registers a multiple, e. g. the tenfold multiple, of the smallest coin unit that may be used in the system, and the unit charge respectively, the contact devices of the said two groups being connected with the contact devices of the other two groups and with the above said relay adapted to prevent the establishing of a desired connection under the control of the contact devices, in such a manner that the said relay is controlled exclusively by the contact devices of the two first-named groups, i. e. without checking of the number of coin units and charge units registered in the other groups, if the number of tenfold coin units of the amount paid exceeds the number of tenfold charge units corresponding to the setting of the charge indicating devices.

Two examples of coin control circuits according to the invention are shown in the drawing where Fig. 1 is a circuit digram of the control circuit in which rotary switches are used for registering the amount paid, and Fig. 2 illustrates a coin control circuit in which chains of relays are used for registering the amounts paid.

In the following explanation of the operation of the control circuits shown in the drawing, it is assumed that the coins dropped into the coin apparatus of a subscriber initiate pulses of some kind for indicating in the coin control circuit the number of coins, and if coins of different values are used, then also the value of the coins. The said pulses operate relays in the coin control circuit. These relays are illustrated in the drawing only by the contacts $v$, $m$ and $n$ thereof. To simplify the description, it is also assumed that the smallest coin which can be used in the system is a 10 Øre piece corresponding to the charge for a local call.

The coin registering devices MEV and MOV shown in Fig. 1 are assumed to be so arranged as to be advanced by one step under the influence of the above named pulses for each 10 Øre piece dropped into the coin apparatus so as to add up the amounts paid. For registering the charge corresponding to a desired connection, contact devices TEV and TTV are provided which are assumed to be so arranged as to be advanced by one step under the influence of pulses received from the meter (not shown) associated with the lines of the coin apparatus for each amount of 10 Øre of which the charge is composed. Thus, if a call is desired, for which the charge is 30 Øre, the said contact devices are automatically advanced by three steps. The checking aimed at according to the invention is effected by comparing the contact positions of the contact devices TEV and TTV set by the pulses from the meter, on one hand, and the contact positions of the contact devices MEV and MOV set by the coin pulses, on the other hand.

A, B and C, Fig. 1, are the wires of the line circuit of the coin apparatus, and D is the metering wire of the said circuit. In the wire C of the line equipment, a relay P is inserted which at the establishment of a connection to the line in question is operated together with the usual breaking relay of the line and thereby closes a contact $p$. An auxiliary relay R is energized by way of the latter.

In the metering wire D, a relay T is inserted which is arranged to operate its contact $t$ each time a pulse is received from the meter.

O is a relay which for each 10 Øre of the amount dropped into the coin apparatus of the subscriber receives a pulse by way of one or the other of the coin pulse controlled contacts $v$, $m$ and $n$.

When the relay O operates, it closes its contacts $o$ in a circuit connection by way of two driving magnets KE and KO respectively for the two contact devices MEV and MOV serving to register the amount paid. Each time these contacts $o$ are closed, the contact devices MEV and MOV are advanced by one step. When the contact device MEV is in the position 1, a contact device MTV serving to register the Krone amount of the amount paid receives a pulse, as a circuit is closed by way of the driving magnet KT of this contact device from the contact of the bank MEV$a$ and two contacts INTT and HKT controlled by the contact device itself. Thereby the contact device MTV is advanced by one step from its initial position.

When the contact device MEV has received nine pulses and has thereby been set on its ninth contact, then, when the relay O again receives a coin pulse and thereby causes the contact device MEV to be advanced by a further step, the contact device will close a circuit by way of the contact MEV$a$9 and a contact $o_1$ controlled by the relay O as well as the coupling magnet KT, whereby the contact device MTV is advanced by one step. In this manner, the contact device MTV will be advanced by one step for each amount of 1 Krone dropped into the coin apparatus. The contact devices MTV and MEV combine to indicate the total amount paid. For example when MTV is in position 2, and MEV in position 2, this means that Kr. 1.20 has been paid into the coin apparatus.

When a connection has been established, the relay T receives a number of pulses corresponding for example in the rate system A to the charge for a conversation of three minutes, in which case the relay T receives twelve pulses corresponding to the above said amount of Kr. 1.20. Each time the relay T is operated and thereby closes the contact $t$, the coupling magnet TK1 of the contact device TEV receives a pulse by way of the contact $t$, whereby the said contact device, which is in the structural form of a rotary switch is advanced by one step. When the contact device TEV in this manner has gradually been advanced to its position 9, then, when the relay T receives the next pulse from the meter, a circuit will be closed from the contact TEV$a$9, a closing contact $t_1$, controlled by the relay T, and the driving magnet TK2 of a contact device TTV which is also in the structural form of a rotary switch, whereby the latter is advanced by one step. Accordingly, the last named contact device is advanced by one step for every tenth pulse from the meter, and the two contact devices TEV and TTV combine to indicate the total number of metering pulses corresponding to the charge for the desired connection. If the rate system B is used, the relay C receives one pulse, if the basic charge is 10 Øre.

When a checking of the amount paid is to be effected, a relay represented in the drawing by the contact $h$ thereof is operated, whereby a circuit including a relay K and a resistance R1 is closed by way of the said contact $h$ controlled by the said relay. As will be understood from the examples given below, the relay K will be short-circuited by way of the contact devices MEV, MOV, MTV, TEV and TTV in series, if the amount paid corresponds to or exceeds the charge for the said conversation, i. e. exceeds the charge on which the contact devices TEV and TTV are then set. Accordingly, the relay K cannot operate, when the contact $h$ is closed. If, on the other hand, the amount paid is smaller than the amount of the charge indicated by the contact devices TEV and TTV, the circuit connection by way of the said contact devices, which in the instance previously referred to short-circuited the relay K, will be open, and the relay K will then operate, when the contact $h$ is closed and will thereby operate a contact $k$ in the circuit extending by way of the breaking relay U of the line in question, whereby the latter relay opens a contact $u$ controlled thereby to interrupt the connection by way of the line A, B.

In the embodiment shown in Fig. 1, two contact devices MEV and MOV are used for registering the Øre amount, but a single rotary switch may be used for this purpose provided it is constructed with a sufficiently great number of levels. The contacts of the bank levels MEV$b$–$e$ and the contacts of the bank levels MOVa–e are connected to the contacts of the bank level TEVb as follows: the contact TEVb1 to the contact MEVb1, the contact TEVb2 to the contact MEVc2, the contact TEVb3 to the contact MEVd3, the contact TEVb4 to the contact MEVe4, the contact TEVb5 to the contact MOVa5, the contact TEVb6 to the contact MOVb6 etc. The contacts in the bank levels of the contact devices MEV and MOV lying between the ninth contacts and the contact in each of these bank levels connected to a contact in the bank level TEVb are mutually connected as shown in Fig. 1. Hereby it is obtained that each of the contacts of the bank level TEVb will be connected through to the relay K by way of the bank level of the contact devices MEV and MOV connected to the contact in question, if the positions of these contact devices correspond to the charge on which the bank level TEVb is set and for any other position of the banks of the contact devices MEV and MOV registering amounts exceeding the amount of the charge registered in the contact device TEV.

The contacts MTVa1–11 are connected to the contacts TTVa12 and 1–10. The latter contacts indicate by the setting of the contact device TTV the received series of ten metering pulses. The contacts MTVb2, MTVc3, MTVd4, MTVe5 and MTVf6 of the bank levels MTVb–e are connected respectively to the contacts 2–6 of the bank level TTVb, but to simplify the illustration these connections are not shown in Fig. 1. Moreover, the 3rd to 12th contact of the bank level MTVb, the 4th to 12th contact of the bank level MTVc ... and the 6th to 12th contact of the bank level MTVf are mutually connected. A circuit will then be closed by way of MTVb and TTVb, when the contact device MTV is in a position corresponding to the payment of Kr. 2.00 or more, and a circuit will be closed by way of MTVc when Kr. 3.00 has been paid etc. The contact TTVa1 corresponds to the position where ten metering pulses have been received, TTVa2 to the position where twenty metering pulses have been received etc. If the number of Kroner in the amount paid exceeds the number of Kroner in the amount of the charge, the relay K will be short-circuited, and the conversation then proceeds without hindrance.

The operation of the coin control circuit shown in Fig. 1 will be more readily understood from the examples given below.

Example 1

It is assumed that the rate system A is used, and that the charge for a desired call is 40 Øre. When initiating the call, the subscriber drops 10 Øre and thereafter he would have to pay 30 Øre, but the subscriber is not in possession of more 10 Øre pieces and therefore drops two 25 Øre pieces, or in other words, he pays 60 Øre instead of 40 Øre. The contact device MEV is then set by the coin pieces received in its 6th position and the contact device MTV in position 1, while the contact device TEV is set in position 4 corresponding to four metering pulses representing the charge of 40 Øre. The contact device TTV is in position 12. When the coin checking is effected by the closing of the contact h, the relay K will be short-circuited by way of the contacts MEVe6, TEVb4, TTVa12 and MTVa1. The desired connection is therefore maintained.

Example 2

It is assumed that the charge for the call is Kr. 1.70, and that Kr. 2.10 has been paid. The contact device MEV is then in position 1, MTV in position 3, TEV in position 7 and TTV in position 1, since the charge Kr. 1.70 is represented by seventeen metering pulses. When the checking is effected, the relay K is not short-circuited by way of MEV, TEV, TTVa and MTVa, but by way of the contacts TTVb1 and MTVb3. As will be understood from this example, if the Krone amount paid exceeds the Krone amount of the charge, the Øre amount will not be checked.

Example 3

If the rate system B is used, the basic charge will for instance entitle the subscriber to a conversation over a certain distance for one minute. It is assumed that 40 Øre has been paid at once, whereby the contact device MEV is set in position 4, while MTV remains in position 1. At the commencement of the conversation, the relay T receives a pulse, and the contact device TEV is in position 1, and TTV in position 12. When the coin checking is effected, the relay K will be short-circuited by way of the contacts MEb4, TEVb1, TTVa12 and MTVa1. After one minute the relay T receives a new pulse, and the contact device TEV is then set in position 2. The short-circuiting circuit of the relay K now extends by way of MEVc4 and TEVb2. At the commencement of the fourth period, a shunt-down circuit still exists for the relay K, and the conversation can proceed, but at the commencement of the fifth period, the contact device TEV is set in position 5, and if no further coins are dropped, and the contact device MEV accordingly remains in position 4, no shunt-down circuit is established for the relay K, and the latter will therefore operate to cause the relay U to interrupt the connection established.

The circuit diagram shown in Fig. 2 differs from the one shown in Fig. 1 mainly in that the contact devices MEV and MOV, which in the embodiment of Fig. 1 were in the form of rotary switches, are replaced in the embodiment in Fig. 2 by a relay chain ME, and similarly the contact devices MTV in the form of rotary switches in the embodiment of Fig. 1 have been replaced by a relay chain MT in Fig. 2. Otherwise, the circuit diagram of Fig. 2 comprises the same parts as the circuit diagram of Fig. 1, and these parts have substantially the same function in the two cases. The pulses transmitted from the coin operated telephone apparatus and from the meter, and the manner in which the coin control circuit is maintained by way of the C-wire are exactly as in Fig. 1. Also in the embodiment of Fig. 2, the relay P of the line equipment operates in parallel to the usual breaking relay of the line, when the calling line is connected up to a connecting circuit and the auxiliary relay R is operated by way of the contact p. For every 10 Øre of the amount dropped into the coin apparatus, a circuit is closed by way of the relay O by means of the contacts v, m, n, as above described. When the relay O receives the first pulse, it operates the contact o so that a relay ME1 in the relay chain ME received a current pulse by way of the contact r2, the closing contact of the contact o, a contact me10 controlled by the relay ME10 and all contacts me9, me8 ... me2 in series and one winding of the relay ME1.

When at the end of the pulse the relay O is de-energized, the closing contact of the contact o is opened, and the relay ME2 then receives current in series with the relay ME1 by way of the connection $r_2$ controlled by the relay R, the contact $o$, a breaking contact $me10_2$, the contact $me1$ and the second winding of the relay ME1. When the next pulse is received, the relay ME1 is de-energized, while the relay ME2 is maintained closed by way of the closing contact $o$ and the relay contacts $me10$–$me2$ in series. When this pulse ceases, the relay ME3 will be energized by way of $me2_1$ etc. When the tenth pulse is received, the relay MT1 will be energized by way of the contacts $r_2$, $o_2$, $me1_2$ and $me10_3$ and the contact $mt5$ and the contacts $mt4$–$mt2$ in series. When this pulse ceases, the relay MT2 will be operated in series with the relay MT1 by way of the contact $r3$, the breaking contact $mt5_2$ and the contact $mt1_1$.

After the twentieth pulse, the relay MT3 will be operated, and when the next pulse is received, the relay MT2 is de-energized etc. In this manner, the relay chains ME and MT register the amount paid. Thus, this amount will be Kr. 1.20, when the relays MT1 and MT2, ME2 and ME3 are operated. The maximum amount that can be registered may be increased by increasing of the number of relays in chains MT.

To effect the coin checking, the position of the relays in the relay chains is compared with the position of the contact devices TEV and TTV controlled by the metering pulses by means of the relay T. The contact devices TEV and TTV are constructed as rotary switches. When a connection has been established, the relay T receives a number of pulses corresponding to the charge, and upon reception of each of these pulses the driving magnet TK1 of the contact device TEV receives a current pulse by way of the contact $t$, and the contact device is advanced by one step.

When the contact device TEV has moved to the position 9 and has again received a pulse, a circuit extending by way of the driving magnet TK2 is closed at the contact $t1$, whereby the contact device TTV is advanced by one step. When the amount paid is to be compared with the charge as indicated in the contact devices TEV and TTV, the contact $h$ is closed as above mentioned. The checking relay K has two windings, one of which is connected to the relay chain ME by way of contacts ME10′–ME2′ in series while the other winding of the relay K is connected to the relay chain MT by way of contacts $mt5'$–$mt1'$ in series.

If the amount paid is equal to or exceeds the charge, the relay K will not be operated when the checking is effected, as will appear from the examples given below, but if the amount paid is smaller than the charge, the relay K will operate to close the circuit of the relay U which thereby interrupts the connection established by opening the contact $u$.

Through the breaking contacts ME2′—10′ one winding of the relay K is connected to the switch bank level TEV$b$, as shown in Fig. 2, while the other winding is connected to the contacts of the bank level TTV$a$ by way of the breaking contacts $mt2'$–5′. The relay L is connected to the bank level TTV$a$ through the closing contacts $mt1_2$ and $mt3_2$–$mt5_2$.

The operation of the control circuit shown in Fig. 2 will best be understood from the following examples.

Example 4

Suppose the rate system A is used, and the charge for a desired call is 40 Øre. When 40 Øre is dropped into the coin apparatus, the relay ME5 is energized, and by the transmission of metering pulses representing the said charge, the apparatus TEV is set in position 4. The checking circuit then extends from the checking relay contact $h$, the contact TEV$b4$ and the breaking contact $me5'$ to the relay K. However, the relay K does not operate, because the circuit is interrupted at the breaking contact $me5'$, and accordingly, the conversation can be conducted without hindrance. If 60 Øre had been dropped instead of 40 Øre, the relay ME7 would have operated to open the breaking contact $me7'$, and the circuit by way of the relay K would then have been interrupted at the said contact, so that the conversation can also proceed without hindrance in this instance.

Example 5

If the charge for a desired call is Kr. 1.70, and this amount is dropped, the relays MT2 and ME8 will be operated, if the said charge has been paid, and hence the relay K does not operate when the checking of the payment is effected, because the circuits of both windings of the relay K are interrupted, viz. at the contact $me8'$ and the contact $mt2'$, and the conversation therefore proceeds without hindrance. If a higher amount, e. g. Kr. 2.10 is dropped, both relays ME2 and MT3 are operated. The circuit of the relay K is therefore not interrupted at the breaking contacts $me$, but the relay still does not operate, because the relay L is operated by way of the closing contact $h$, the contact TTV$a1$ and the closing contact $mt3'$ and thereby interrupts the battery connection to the relay K. As appears from the example, if the Krone amount paid exceeds the Krone amount of the charge, the Øre amount will not be checked.

Example 6

Suppose the rate system B is used and 40 Øre has been paid. The relay ME5 then operates. At the commencement of the conversation the relay T receives a metering pulse, and the switch TEV is advanced by one step. When the coin checking is effected, the relay K is not operated, because its circuit is open at the breaking contact $me5'$ of the relay ME5. This circuit remains open during the first four one-minute periods, but at the commencement of the fifth one-minute period, the device TEV will move to position 5 by receiving a fifth metering pulse, and the relay K is then operated by way of the contact TEV$b5$, provided no further relay ME, or in other words the relay ME6 etc. has been operated by the dropping of further coins.

The coin control circuits above described can also be used if the charge is indicated to the coin control circuit otherwise than by metering pulses. The rate may e. g. be indicated directly from a time zone metering device or from a follow-up device by the setting of rotary switches or relays in the coin control circuit. The position of these switches or relays is compared with the position of the coin registering switches or relays in the same manner as described above.

I claim:

1. A coin control device for telephone plants with subscribers having coin operated means for transmitting electric pulses controlled by deposit of different coins and means for transmitting charge indicating pulses, comprising a multi-stage contact device responsive to the pulses controlled by the coin operated means, a second multi-stage contact device responsive to the charge indicating pulses, a relay for controlling the interruption of an established connection between a calling and a called subscriber, an energizing circuit for said relay and conductive connections between the contacts of said two contact devices and between these contacts and the energizing winding of said relay for preventing said relay from operating to interrupt the said established connection, as long as the contact device responsive to the coin controlled pulses is set to a position indicating a value of deposited coins which value is not less than the value indicated by the position to which the contact device responsive to charge indicating pulses is set.

2. A coin control device for telephone plants with subscribers having coin operated means for transmitting electric pulses controlled by deposit of different coins and means for transmitting charge indicating pulses, comprising a contact device responsive to the pulses controlled by the coin operated means, a contact device responsive to the charge indicating pulses, a line relay for controlling a contact member through which the connection between a calling and a called subscriber is to be established, a control relay for controlling a contact in the energizing circuit of said line relay, and a short-circuiting connection connected up between the terminals of the energizing winding of said control relay and comprising in series pulse controlled movable contact members of the contact device which is responsive to pulses controlled by the deposit of coins, stationary contacts of this latter contact device which stationary contacts indicate the position corresponding to different values of deposited coins, pulse-controlled movable contact members of the contact device to be set by charge-indicating pulses, and stationary contact members cooperating with said movable contact members of the contact device responsive to charge indicating pulses.

3. A coin control device as defined in claim 1 in which the contact device responsive to charge indicating pulses comprises a selector switch, the wiper of which is connected to one terminal of the energizing winding of the relay controlling the multi-stage interruption of the line connection, and in which the second multi-stage contact device responsive to pulses controlled by deposited coins comprises a selector switch having several contact-banks, the wipers of which are electrically interconnected and connected to the other terminal of said energizing winding, each of which contact banks contains a separate bank contact which is connected to a separate contact of the bank of the selector switch to be set by charge indicating pulses, and is so located in the bank that the said electrically interconnected wipers when simultaneously stepped over their appurtenant contact banks will not engage their said separate bank contact simultaneously but at mutually different positions during their stepwise motion.

ERNEST UNGAR.

REFERENCES CITED

The following references are of record in the file of this patent:

UNITED STATES PATENTS

| Number | Name | Date |
|---|---|---|
| 1,830,873 | Haines | Nov. 10, 1931 |
| 1,895,020 | Bascom | Jan. 24, 1933 |
| 2,000,804 | Wehren | May 7, 1935 |
| 2,020,466 | Hatton et al. | Nov. 12, 1935 |
| 2,082,561 | Appelius | June 1, 1935 |
| 2,122,550 | Adrian | July 5, 1938 |
| 2,224,702 | Seidel | Dec. 10, 1940 |
| 2,230,486 | Durant | Feb. 4, 1941 |
| 2,306,654 | Triman | Dec. 29, 1942 |